Figures 1, 2:
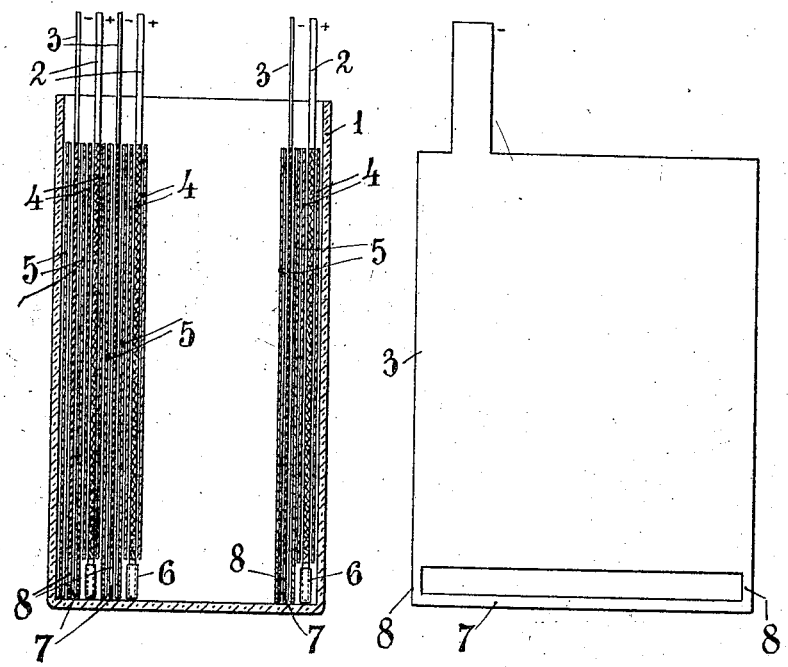

June 10, 1924.

A. POUCHAIN 1,497,161

ELECTRIC ACCUMULATOR

Filed March 24 1921

Inventor
A. Pouchain
by Lawrence Langner
Atty.

Patented June 10, 1924.

1,497,161

UNITED STATES PATENT OFFICE.

ADOLFO POUCHAIN, OF TURIN, ITALY.

ELECTRIC ACCUMULATOR.

Application filed March 24, 1921. Serial No. 455,276.

*To all whom it may concern:*

Be it known that I ADOLFO POUCHAIN, a subject of the King of Italy, and resident of Turin, Italy, have invented certain new and useful Improvements in Electric Accumulators, of which the following is a specification.

This invention relates to electric accumulators and has for its object an improvement in electric accumulators formed of negative electrodes, which may consist of zinc, which alternate with positive electrodes provided with the active material.

It is known that in accumulators of the described kind the positive and negative electrodes are generally kept spaced apart from the bottom of the cell enclosing them, in order to leave a free space above said bottom in which collects the material falling from the electrodes during the operation of the accumulator. According to the present invention a flat bottom cell is used, the positive electrodes being supported thereon by insulating parts, as usual, while the negative electrodes have their lower edges substantially at the same level as that of the positive ones, but are each provided with a lower extension which bears on the cell bottom and acts both to support the electrode and to ensure the contact of the electrode with the material fallen therefrom.

According to this invention the zinc plates forming the negative electrode have substantially the same area as the positive electrodes and are located with their lower edges substantially at the same level as the lower edges of the positive electrodes, that is spaced apart the cell bottom, but said negative electrodes are provided with an arc shaped part of conducting material which reach the cell bottom. By this arrangement, while having a cell with flat bottom and the plates spaced apart from the bottom of the cell, the active material falling from the negative is still in contact with said negative electrode and it continues to operate in the accumulator.

The annexed drawing shows an embodiment of this invention; Figure 1 is a diagrammatic transverse section showing the arrangement of the plates in the accumulator-cell; Figure 2 is the front view of one of the negative electrodes removed from the cell.

As shown by Figure 1 the accumulator comprises a flat bottom cell 1 in which are located positive plates 2 and negative plates 3 alternating with each other; said positive plates 2 are embraced between plates 4 insulated from negative plates 3 by means of separators 5 of insulating material as celluloid, wood or the like.

As usually each positive plate 2 is kept raised with its lower edge spaced apart from the bottom of the cell 1 by means of insulating supports or feet 6.

According to the feature of this invention each negative electrode is provided with a lower band 7 parallel with its lower edge and connected with the plate body by means of tongues 8. Said band and tongues are of a good conducting material and they may be integral with the plate body or be secured to it in any suitable manner.

By this construction the area of each negative electrode is substantially equal to that of the opposite positive electrode but means are provided for holding in operation the active material fallen from the negative plate.

Short circuits between the negative and positive electrodes are prevented by the fact that the positive plates have their lower edges spaced from the cell bottom by insulating supports while the material fallen from the negative plates is held in contact with the same by the bands 7.

It is to be understood that the present invention is not confined to the described embodiment, this invention being only defined by appended claim.

What I claim as my invention and desire to secure by United States Letters Patent is:—

In electric accumulators comprising negative and positive plates alternating with each other and having their lower edges spaced apart from the bottom of the cell, a cell with flat bottom, positive plates each supported by insulating supports and negative plates each having an opening near its lower edge, the plate strip under said opening being of conducting material and resting on the bottom of the cell.

Signed at Turin, Italy, this 5th day of March, A. D. 1921.

ADOLFO POUCHAIN.